UNITED STATES PATENT OFFICE.

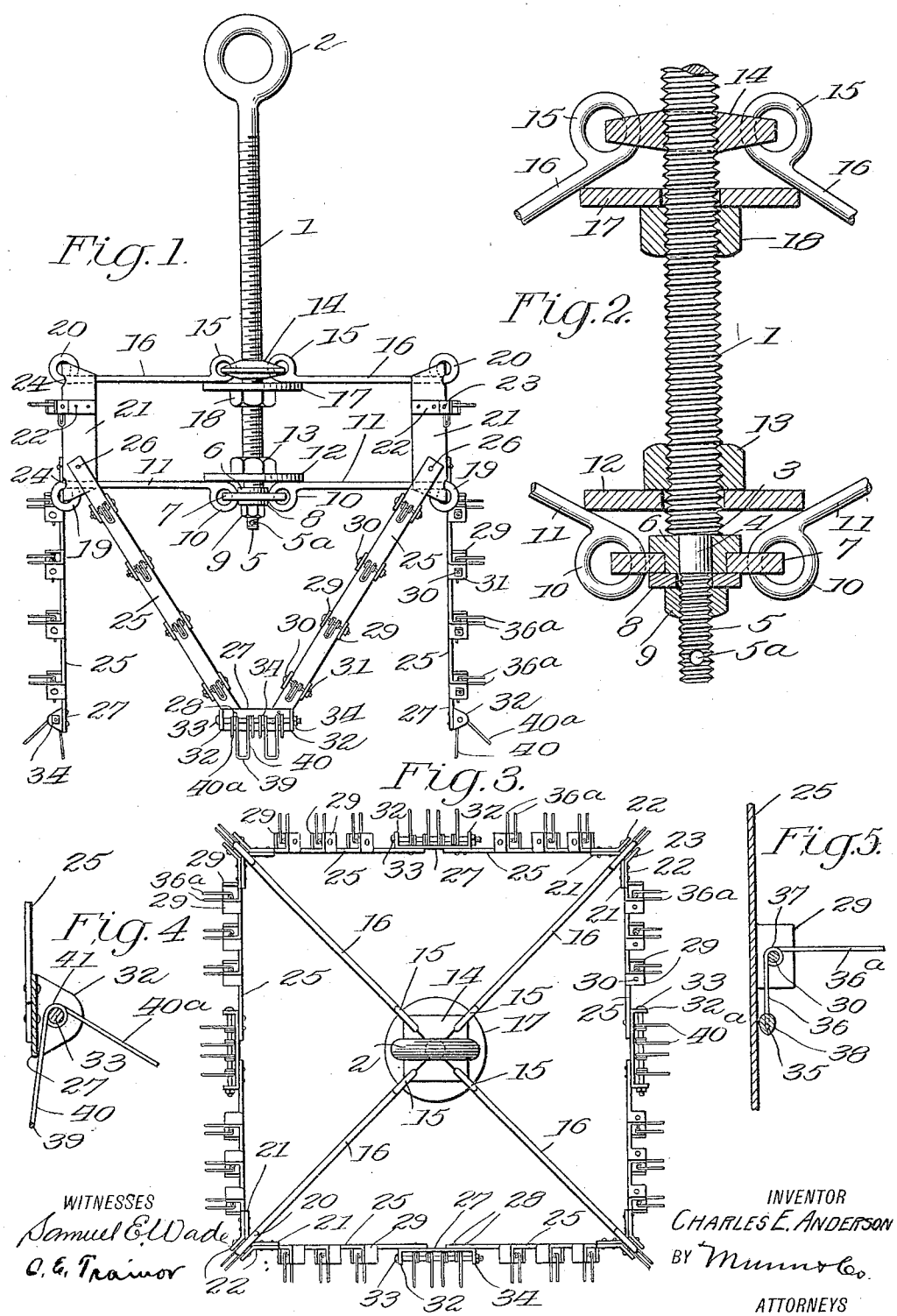

CHARLES E. ANDERSON, OF CRYSTAL FALLS, MICHIGAN.

CHIMNEY-SWEEPER.

1,110,856.

Specification of Letters Patent. Patented Sept. 15, 1914.

Application filed May 1, 1914. Serial No. 835,694.

*To all whom it may concern:*

Be it known that I, CHARLES E. ANDERSON, a citizen of the United States, and a resident of Crystal Falls, in the county of Iron and State of Michigan, have invented a new and useful Improvement in Chimney-Sweepers, of which the following is a specification.

My invention is an improvement in chimney sweepers, and has for its object to provide a device of the character specified, for cleaning chimneys having other than circular cross section, capable of being drawn through a chimney, and having mechanism for thoroughly cleaning the walls of the chimney during the passage through the same, and wherein the sweeper is adjustable and capable of cleaning the walls thoroughly whether or not the chimney is straight.

In the drawings:—Figure 1 is a side view of the improved cleaner, Fig. 2 is an enlarged section through the supporting rod, Fig. 3 is a top plan view, Fig. 4 is an enlarged detail of a portion of the cleaner, and Fig. 5 is a similar view of another portion.

The present embodiment of the invention is supported by a threaded rod 1, having at one end a loop or eye 2, for connection with supporting mechanism for permitting the cleaner to be drawn through the chimney to be cleaned. The opposite end of the rod from the eye 2 is reduced to form an annular shoulder 3 between the reduced portion and the body of the rod, and the rod is provided with a plain portion 4 adjacent to the shoulder, and the remainder of the reduced portion is threaded as shown at 5. The rod is also provided with a transverse opening 5ª at the extremity of the reduced threaded portion.

A bearing ring 6 is arranged on the plain portion 4. The lower end of the ring is reduced annularly, and a washer 7 is fitted on to the reduced portion, the lower face of the washer being flush with the lower end of the ring.

A washer 8 is arranged below the washer 7, and a nut 9 having a polygonal periphery is threaded on to the reduced portion below the washer 8. The washer 7 before mentioned, is provided with four openings, the openings being at angular intervals of 90°, and each opening is engaged by an eye 10 on one end of a link 11. A washer 12 encircles the body of the rod above the links 11, and a nut 13 is threaded on to the rod above the washer.

A nut 14 having a polygonal periphery, being square in the present instance as shown in Fig. 3, is threaded on to the body of the rod above the nut 13, and the nut 14 is provided with openings for engagement by eyes 15 on the ends of links 16, the links 16 corresponding in number and arrangement to the links 11 before mentioned. A washer 17 encircles the rod below links 16, and a nut 18 is threaded on to the rod below the washer. The nut 18 has a polygonal periphery as shown in Fig. 1, to permit the nut to be turned by a wrench when desired.

Each of the links 11 is provided at its outer end with an eye 19, and each of the links 16 is provided at its outer end with a similar eye 20. A pair of plates 21 is provided for connecting each eye 19 with the adjacent eye 20, and each pair of plates 21 is connected near its upper end by angle bars 22. Each of the angle bars 22 consists of two portions arranged at an obtuse angle with respect to each other, one of the portions of each bar being riveted to a plate 21, transversely thereof and near its upper end, and the other portions of each pair of angle bars extend approximately parallel as shown more particularly in Fig. 3, and a bolt or rivet 23 is passed through the said portions for securing them together.

The parallel portions of each pair of angle bars 22 extend outwardly beyond and below the eyes 19 and 20, and the said eyes are arranged on the ends of the plates 21. It will be noticed from an inspection of Fig. 1 that the ends of each of the plates 21 are beveled, the said ends inclining inwardly toward the inner edges of the plates. Each plate has its outer edge notched or recessed as shown at 24 at each end for receiving the adjacent ring 19 or 20, as the case may be, and those portions of the plates outside of the notches 24 approach each other through the openings of the rings.

A cleaning device to be later described, is connected with each rivet 23, and other of the said devices are supported below the links 11 in a manner to be presently described. A square frame is formed by the links 11 and 16, and the plates 21, the links 16 connecting the upper ends of the plates 21 to the rod while the links 11 connect the lower ends. The plates 21 form the corners of the frame, and it will be evident that when the nut 14 is moved away from the bearing ring 6, the plates 21 will be moved radially toward the rod 1, while when the nut 14 is in the position shown in Fig. 1, the plates 21 will be at their greatest distance from the center of the frame, that is, from the rod 1. This position of greatest size for the frame is when the links 16 are approximately parallel with the links 11.

A series of cleaning devices is supported at each side of the frame above mentioned, each series depending from the frame and arranged to be adjusted therewith. A plate 25 is pivoted to each plate 21, by means of a rivet 26 or the like, the pivotal connection being near the lower end of the plate 21. The plates connected with the plates 21, which are in the same plane, converge toward each other downwardly as shown in Fig. 1, and the lower ends of the said plates are connected by a cross plate 27, which is pivoted to the lower end of each of the said pair of plates by means of a rivet 28.

Each of the plates 25 is provided with pairs of outwardly extending lugs 29, the members of each pair of lugs registering, and the pairs being spaced apart at regular distances. The members of each pair of lugs have registering openings, and a bolt 30 is passed through the opening of each pair and is engaged by a nut 31 to hold it in place.

Each of the plates 27 is provided at each of its ends with a lateral lug 32, and the lugs have registering openings through which is passed a bolt 33. A nut 34 engages the bolt to hold it in place, and a plurality of cleaning devices is arranged on each of the bolts 33. The cleaning devices on the rivets 23 and on the bolts 33 are similar, one of the said devices being shown in Fig. 5.

Each of the said devices is formed from a single piece of wire, doubled upon itself to form a body 35 and a pair of angular arms, each arm consisting of portions 36 and 36ª arranged at a right angle with respect to each other and having a bearing coil 37 at their junction. The body 35 of the cleaning device is adjacent to the face of the plate 25, and preferably a weight 38 is arranged on the body to hold the portions 36ª of the arms extending perpendicularly from the adjacent plate 25. This weight may be a shot or like small article of considerable weight clamped on the body. The bearing coils 37 engage the bolts 30 or the rivets 23, as the case may be, and the portions 36ª of the arms extend outwardly beyond the outer ends of the bearing lugs 29.

One of the cleaning devices connected with the bolts 33 is shown in Fig. 4, and two of the said devices are connected with each bolt. Each of the said devices is formed from a single piece of wire bent upon itself to form a body 39, and a pair of arms, each arm consisting of a portion 40 and a portion 40ª arranged at an acute angle with respect to each other and separated by a bearing coil 41. The cleaning devices are arranged on the bolts in such manner that the portions 40 of the arms of each device depend below the plate 27, while the portions 40ª of the arms extend outwardly and downwardly. The coils 41 engage the bolts 33.

In operation the rod 1 is rotated in the proper direction to move the nut 14 toward or away from the bearing ring 6, to enlarge the frame or decrease the size thereof as may be desired. When the links 16 are parallel with the links 11 the frame is at its greatest size and when it is desired to lessen or decrease the size of the frame the nut 14 is moved away from the bearing ring 6. When the frame has been adjusted to the size of the chimney to be cleaned, the frame is drawn through the chimney by means of a rope or cable, and it will be evident that all of the accretions will be removed from the chimney wall, as for instance, soot, dirt and the like.

The arms 36ª and 40ª of the cleaning devices have sufficient strength to break away dried mud as for instance, chimney swallows' nests and the like. When the machine is drawn upward through the chimney, the arms 36ª and 40 of the cleaning devices will engage and tear away the soot and the like, and the said arms are of resilient material, so that they may bend sufficiently to prevent injury to the arms. A weight may be connected with the frame if desired, and this is preferable when the chimney is not straight.

The arms 36ª and 40ª are preferably of sufficient length to prevent catching or jamming of the cleaner in the chimney, the arms giving or yielding to permit the cleaner to be drawn through the chimney. The cleaning devices 39—40—40ª are not weighted, and the outwardly extending arms of all of the cleaning devices will yield upwardly to permit reverse movement of the cleaner.

The cleaning devices 35—36—36ª without the weight 38 may take a position with the portions 36ª of the arms parallel with the plate 25, but this is not possible with the devices 39—40—40ª. It will be noted that each plate 27 is pivoted to one plate 25 by a single rivet while the said plate is connected to the other plate 25 by two rivets. The plates 25 and 27 are of resilient material, and the two-rivet connection between one of the plates 25 and the plate 27 permits adjustment and at the same time holds the parts more rigid than would be the case were there but a single rivet at each side.

The washers 12 and 17 act as supports for the inner ends of the adjacent series of links, and after the nut 14 has been adjusted to the proper distance from the bearing ring 6, the nuts 13 and 18 are adjusted until the washers 12 and 17 engage against the adjacent series of links as indicated in Figs. 1 and 2. The links are then held rigidly against movement toward each other, and a considerable degree of rigidity is imparted to the frame. Before proceeding to adjust from one position to the other the nuts 13 and 18 must be turned to loosen the washers 12 and 17.

I claim—

1. A chimney cleaner, comprising a threaded rod having at its upper end an eye for connection with supporting mechanism, the opposite end of the rod being reduced, said rod having a plain portion at the inner end of the reduced portion, the remainder of the reduced portion being threaded, a bearing ring journaled on the plain portion and provided with transverse openings arranged at angular intervals of 90° with respect to each other, a link engaging each opening, a nut threaded on to the rod above the bearing ring and provided with transverse openings corresponding in number and position to the openings of the ring, a link for each opening, each link having an eye engaging the opening, washers on the rod above the bearing ring and below the nut, nuts on the inner sides of the washers, each of the links having an eye at its outer end and the upper links registering with the lower links, a pair of plates connecting the eyes of the adjacent links, a bar pivoted to the lower end of each plate, the bars of the plates in the same plane converging downwardly, a plate connecting the converging ends of each pair of bars, and a series of cleaning devices supported by each bar and each of the last-named plates, and a similar cleaning device supported by each pair of first-named plates, each of the cleaning devices comprising a rod bent upon itself to form a body, and a pair of parallel arms, each consisting of two portions arranged at an angle with respect to each other and connected by a bearing coil, each bar having spaced pairs of bearing lugs and each of the last-named plates having similar lugs at its ends, a bolt supported by each pair of lugs, the coils of the cleaning devices engaging the bolts, and weights on the body portions of the cleaning devices of the bars.

2. A chimney cleaner comprising a threaded rod having at its upper end an eye for connection with supporting mechanism, the opposite end of the rod being reduced, said rod having a plain portion at the inner end of the reduced portion, the remainder of the reduced portion being threaded, a bearing ring journaled on the plain portion and provided with transverse openings arranged at angular intervals of 90° with respect to each other, a link engaging each opening, a nut threaded on to the rod above the bearing ring and provided with transverse openings corresponding in number and position to the openings of the ring, a link for each opening, each link having an eye engaging the opening, washers on the rod above the bearing ring and below the nut, nuts on the inner sides of the washers, each of the links having an eye at its outer end and the upper links registering with the lower links, a pair of plates connecting the eyes of the adjacent links, a bar pivoted to the lower end of each plate, the bars of the plates in the same plane converging downwardly, a plate connecting the converging ends of each pair of bars, and a series of cleaning devices supported by each bar and each of the last-named plates, each of the cleaning devices comprising a rod bent upon itself to form a body, and a pair of parallel arms each consisting of two portions arranged at an angle with respect to each other and connected by a bearing coil, each bar having spaced pairs of bearing lugs and each of the last-named plates having similar lugs at its ends, a bolt supported by each pair of lugs, the coils of the cleaning devices engaging the bolts, and weights on the body portions of the cleaning devices of the bars.

3. A chimney cleaner, comprising a threaded rod having at its upper end an eye for connection with supporting mechanism, the opposite end of the rod being reduced, said rod having a plain portion at the inner end of the reduced portion, the remainder of the reduced portion being threaded, a bearing ring journaled on the plain portion and provided with transverse openings arranged at angular intervals of 90° with respect to each other, a link engaging each opening, a nut threaded on to the rod above the bearing ring and provided with transverse openings corresponding in number and position to the openings of the ring, a link for each opening, each link having an eye engaging the opening, washers on the rod above the bearing ring and below the nut, nuts on the inner sides of the washers, each of the links having an eye at its outer end and the upper links registering with the lower links, a pair of plates connecting the eyes of the adjacent links, a bar pivoted to the lower end of each plate, the bars of the plates in the same plane converging downwardly, a plate connecting the converging ends of each pair of bars, and a series of cleaning devices supported by each bar and each of the last-named plates, and a similar cleaning device supported by each pair of the first-named plates.

4. A chimney cleaner, comprising a threaded rod having at its upper end an eye for connection with supporting mechanism, the opposite end of the rod being reduced, said rod having a plain portion at the inner end of the reduced portion, the remainder of the reduced portion being threaded, a bearing ring journaled on the plain portion and provided with transverse openings arranged at angular intervals of 90° with respect to each other, a link engaging each opening, a nut threaded on to the rod above the bearing ring and provided with transverse openings corresponding in number and position to the openings of the ring, a link for each opening, each link having an eye engaging the opening, washers on the rod above the bearing ring and below the nut, nuts on the inner sides of the washers, each of the links having an eye at its outer end and the upper links registering with the lower links, a pair of plates connecting the eyes of the adjacent links, a bar pivoted to the lower end of each plate, the bars of the plates in the same plane converging downwardly, a plate connecting the converging ends of each pair of bars, and a series of cleaning devices supported by each bar and each of the last-named plates.

5. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a pair of plates connecting the registering links and pivoted to the links at their ends, a bar pivoted to each plate, the bars of the plates in the same plane converging toward their lower ends, a plate connecting the converging ends of each pair of bars, a series of cleaning devices supported by each bar, a series of cleaning devices supported by each of the last-named plates, and a cleaning device supported by each pair of plates, means adjustable on the rod below the nut and above the rings for engaging the links to make the said link rigid, each of the cleaning devices comprising portions extending at an angle to each other and connected at the junction of the said portions.

6. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering, with the links of the ring, a pair of plates connecting the registering links and pivoted to the links at their ends, a bar pivoted to each plate, the bars of the plates in the same plane converging toward their lower ends, a plate connecting the converging ends of each pair of bars, a series of cleaning devices supported by each bar, a series of cleaning devices supported by each of the last-named plates, and a cleaning device supported by each pair of plates, and means adjustable on the rod below the nut and above the rings for engaging the links to make the said link rigid.

7. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a pair of plates connecting the registering links and pivoted to the links at their ends, a bar pivoted to each plate, the bars of the plates in the same plane converging toward their lower ends, a plate connecting the converging ends of each pair of bars, a series of cleaning devices supported by each bar, a series of cleaning devices supported by each of the last-named plates, and a cleaning device supported by each pair of plates, each of the cleaning devices comprising portions arranged at an angle and connected at the junction of the portions.

8. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a pair of plates connecting the registering links and pivoted to the links at their ends, a bar pivoted to each plate, the bars of the plates in the same plane converging toward their lower ends, a plate connecting the converging ends of each pair of bars, a series of cleaning devices supported by each bar, a series of cleaning devices supported by each of the last-named plates, and a cleaning device supported by each pair of plates.

9. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a pair of plates connecting the registering links and pivoted to the links at their ends, a bar pivoted to each plate, the bars of the plates in the same plane converging toward their lower ends and connected at their converging ends, and a series of cleaning devices supported by each bar, each of the said devices being pivotally connected to the bar and comprising two portions arranged at an angle with respect to each other and connected at their junction, one of the portions being weighted.

10. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a pair of plates connecting the registering links and pivoted to the links at their ends, a bar pivoted to each plate, the bars of the plates in the same plane converging toward their lower ends, and connected at their converging ends, and a series of cleaning devices supported by each bar, each of the said devices being pivotally connected to the bar and comprising two portions arranged at an angle with respect to each other and connected at their junction.

11. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a pair of plates connecting the registering links and pivoted to the links at their ends, a bar pivoted to each plate, the bars of the plates in the same plane converging toward their lower ends, and connected at their converging ends, and a series of cleaning devices supported by each bar.

12. A chimney cleaner comprising a rod having means at one end for engagement by supporting mechanism, a bearing ring journaled on the rod near the opposite end, a nut threaded on to the rod intermediate its ends and adjustable toward and from the bearing ring, series of links pivoted to the nut and to the ring and extending radially therefrom, the links of the nut registering with the links of the ring, a rigid connection between the outer ends of the registering links, supporting bars depending from the connection, and cleaning devices on the bars.

13. A chimney cleaner comprising a rod having at one end means for engagement by a supporting mechanism, a series of links extending laterally from the rod near the opposite end, a second series of links extending laterally from the rod intermediate the ends thereof, a support for the inner ends of the links of the second series and adjustable longitudinally of the rod, the links of the first series registering with the links of the second series, a rigid connection between the outer ends of the registering links, and cleaning mechanism supported by the said connections.

14. A chimney cleaner comprising a rod, an expansible and contractible frame supported by the rod, said frame comprising a plurality of series of links, the links of the series registering and extending radially from the rod, a rigid connection between the outer ends of the registering links, cleaning mechanism supported by the said links, and means for moving the inner ends of one series longitudinally with respect to the rod.

CHAS. E. ANDERSON.

Witnesses:
WARD PERRY,
JAMES J. GAFFNEY.

---

Copies of this patent may be obtained for five cents each, by addressing the "Commissioner of Patents, Washington, D. C."